(12) United States Patent
Ober

(10) Patent No.: US 11,897,407 B2
(45) Date of Patent: Feb. 13, 2024

(54) VEHICLE SEAT HAVING A SEAT SYSTEM AND HAVING AN AIRBAG APPARATUS

(71) Applicant: Bayerische Motoren Werke Aktiengesellschaft, Munich (DE)

(72) Inventor: Florian Ober, Reichersbeuern (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/791,686

(22) PCT Filed: Dec. 8, 2020

(86) PCT No.: PCT/EP2020/084991
§ 371 (c)(1),
(2) Date: Jul. 8, 2022

(87) PCT Pub. No.: WO2021/139940
PCT Pub. Date: Jul. 15, 2021

(65) Prior Publication Data
US 2023/0032966 A1   Feb. 2, 2023

(30) Foreign Application Priority Data

Jan. 10, 2020   (DE) .................... 10 2020 100 450.8

(51) Int. Cl.
*B60R 21/207* (2006.01)
*B60R 21/2338* (2011.01)
*B60R 21/231* (2011.01)

(52) U.S. Cl.
CPC ........ *B60R 21/207* (2013.01); *B60R 21/2338* (2013.01); *B60R 2021/23107* (2013.01); *B60R 2021/23386* (2013.01)

(58) Field of Classification Search
CPC . B60R 21/207; B60R 21/2338; B60R 21/231; B60R 2021/23386; B60R 2021/23107
(Continued)

(56) References Cited

U.S. PATENT DOCUMENTS

2018/0281724 A1*  10/2018  Nagasawa ................ B60N 2/79
2019/0061665 A1    2/2019  Kondrad et al.
(Continued)

FOREIGN PATENT DOCUMENTS

CN    108297819 A    7/2018
CN    109421640 A    3/2019
(Continued)

OTHER PUBLICATIONS

International Search Report (PCT/ISA/210) issued in PCT Application No. PCT/EP2020/084991 dated Jan. 27, 2021 with English translation (five (5) pages).
(Continued)

*Primary Examiner* — Keith J Frisby
(74) *Attorney, Agent, or Firm* — Crowell & Moring LLP

(57) ABSTRACT

A vehicle seat for a motor vehicle has a seat system including a seat cushion and a backrest, and an airbag apparatus which has an airbag and a retaining element, which is tensioned by filling the airbag. The retaining element has a connection region in which the retaining element is coupled to the airbag. By filling, the airbag can be moved from a stowed position to a functional position in which the airbag provides impact protection for an upper body of a seat occupant in the longitudinal direction of the vehicle seat. The retaining element has an additional connection region in which the retaining element is coupled to a retaining device of the vehicle seat. The retaining device is spaced apart from the backrest in the longitudinal direction of the vehicle seat.

12 Claims, 2 Drawing Sheets

(58) Field of Classification Search
USPC .............................. 280/728.1, 728.2, 730.1
See application file for complete search history.

(56) References Cited

U.S. PATENT DOCUMENTS

| | | | |
|---|---|---|---|
| 2019/0092264 A1 | 3/2019 | Spahn et al. | |
| 2019/0106077 A1 | 4/2019 | Dry et al. | |
| 2019/0152359 A1* | 5/2019 | Spahn | B60N 2/42745 |
| 2019/0217803 A1* | 7/2019 | Dry | B60R 21/2338 |
| 2019/0248323 A1* | 8/2019 | Saito | B60R 21/23138 |
| 2019/0275979 A1 | 9/2019 | Dry et al. | |
| 2019/0389414 A1 | 12/2019 | Masuda et al. | |

FOREIGN PATENT DOCUMENTS

| | | |
|---|---|---|
| CN | 110154971 A | 8/2019 |
| DE | 10 2014 226 745 A1 | 6/2016 |
| DE | 10 2017 131 121 A1 | 6/2019 |
| DE | 10 2018 106 459 A1 | 9/2019 |
| DE | 20 2019 106 282 U1 | 11/2019 |
| EP | 3 527 440 A1 | 8/2019 |
| FR | 2 927 592 A1 | 8/2009 |
| JP | 9-39625 A | 2/1997 |
| JP | 2018-161966 A | 10/2018 |
| JP | 2019-218013 A | 12/2019 |
| WO | WO 2019/121222 A1 | 6/2019 |

OTHER PUBLICATIONS

German-language Written Opinion (PCT/ISA/237) issued in PCT Application No. PCT/EP2020/084991 dated Jan. 27, 2021 (five (5) pages).

German-language Office Action issued in German Application No. 10 2020 100 450.8 dated Apr. 23, 2021 with partial English translation (four (4) pages).

English-language Chinese Office Action issued in Chinese application No. 202080092071.2 dated May 31, 2023 (Nine (9) pages).

* cited by examiner

VEHICLE SEAT HAVING A SEAT SYSTEM AND HAVING AN AIRBAG APPARATUS

BACKGROUND AND SUMMARY

The invention relates to a vehicle seat for a motor vehicle, having a seat unit which comprises a seat cushion and a backrest, and having an airbag apparatus which has at least one airbag and at least one restraining element. The restraining element can be tensioned by filling the airbag and has a connecting region in which the restraining element is coupled to the airbag. Due to the filling, the airbag can be brought from a stowage position into a functional position. In the functional position, the airbag provides an impact protection for the upper body of a seat occupant of the vehicle seat in a longitudinal direction of the vehicle seat.

Usually, in the case of a vehicle seat for a motor vehicle, a seatbelt ensures that the seat occupant is restrained in the vehicle seat in the case of rapid deceleration of the motor vehicle. This is because the seatbelt is able to dissipate correspondingly high amounts of energy, as would occur for instance in the case of sudden braking or on account of an impact of the motor vehicle equipped with the vehicle seat against an obstacle. The seatbelt also always bears directly against the seat occupant. However, with regard to the freedom of movement of the seat occupant, it would be desirable if the seatbelt could be dispensed with.

DE 10 2017 131 121 A1 describes a vehicle occupant protection system having an airbag module which is installed in a backrest of a vehicle seat. The airbag comprises a main chamber and a stabilizing element, wherein the main chamber is arranged in front of the vehicle occupant in a deployed and filled state of the airbag. The airbag encloses the vehicle occupant in a cocoon-like manner in the deployed and filled state. The stabilizing element is in the form of a tubular airbag chamber which is filled first during the filling of the airbag. The stabilizing element formed by the tubular airbag chamber initially straddles the vehicle occupant in an arcuate manner. Subsequently, the stabilizing element pivots downward about a rotational point formed on the backrest. The rotation of the stabilizing element about the rotational point is triggered by the filling of the main chamber. In addition, the filling of the main chamber has the effect of spreading out side elements of the airbag on both sides of the vehicle occupant, said side elements being connected to the structure of the vehicle seat.

In the case of such an occupant protection system, it is necessary for the main chamber of the airbag to be filled with gas only after the filling of the tubular airbag chambers. Consequently, the duration of the time period required for the filling of the stabilizing element and the subsequent filling of the main chamber has to be taken into account during the triggering of the airbag. Only when the main chamber of the airbag has been filled and is located in front of the vehicle occupant does the main chamber provide an impact protection for the vehicle occupant or seat occupant. It therefore takes a certain amount of time until the airbag can fulfil its protective function.

It is the object of the invention to provide a vehicle seat of the type mentioned in the introduction by means of which reliable restraint of the seat occupant can be achieved in a particularly rapid manner.

This object is achieved according to the invention by means of a vehicle seat having the features of the independent claim. The dependent patent claims and the description provide advantageous embodiments of the invention.

A vehicle seat according to the invention for a motor vehicle has a seat unit which comprises a seat cushion and a backrest. An airbag apparatus of the vehicle seat has at least one airbag and at least one restraining element. The at least one restraining element can be tensioned by filling of the at least one airbag. The at least one restraining element has a connecting region in which the at least one restraining element is coupled to the at least one airbag. Due to the filling, the at least one airbag can be brought from a stowage position into a functional position. In the functional position, the at least one airbag provides an impact protection for the upper body of a seat occupant of the vehicle seat in a longitudinal direction of the vehicle seat. The at least one restraining element has at least one further connecting region. In the at least one further connecting region, the at least one restraining element is coupled to a holding device of the vehicle seat. The holding device is spaced apart from the backrest in the longitudinal direction of the vehicle seat.

Consequently, the at least one restraining element is also already located in front of the backrest in the longitudinal direction of the vehicle seat already when the airbag is still in its stowage position. Correspondingly, the at least one airbag needs merely to be filled in order to tension the at least one restraining element. And the at least one tensioned restraining element can then be used to introduce energy into the vehicle seat, for instance in the event of an impact of the motor vehicle equipped with the vehicle seat against an obstacle. Due to the spacing apart of the holding device from the backrest in the longitudinal direction of the vehicle seat, the at least one restraining element is also located in front of the seat occupant in the longitudinal direction of the vehicle seat. As a result, the at least one restraining element is used, in cooperation with the at least one airbag, as an arresting device which restrains the seat occupant on the vehicle seat. On account of the at least one restraining element being connected to the holding device in front of the backrest, reliable restraint of the seat occupant can be achieved by means of the vehicle seat in a particularly rapid manner.

This applies in particular if the holding device is spaced apart from the backrest in such a way that, when the back of the seat occupant is in contact with a front side of the backrest, the holding device is located in front of the pelvis, the upper body and the head of the seat occupant in the longitudinal direction of the vehicle seat.

When arranging the vehicle seat in the motor vehicle, the longitudinal direction of the vehicle seat can be arranged in particular parallel to the vehicle longitudinal axis of the motor vehicle. Reliable restraining of the seat occupant in the vehicle seat is then provided in particular in the case of a frontal impact or in the case of a rear impact of the motor vehicle.

As a result of the coupling to the holding device in the at least one connecting region, the restraining elements which are configured, for example, in the manner of holding straps are preferably positioned in front of the seat occupant such that the restraining elements restrain the seat occupant in the event of an accident or crash. In this case, the at least one restraining element preferably ensures, in cooperation with the at least one airbag, that a restraining system comprising these components is closed in front of the seat occupant. This ensures that the seat occupant seated on the seat cushion of the seat unit can be restrained by the restraining system.

In the case of such a vehicle seat, it is in particular possible to dispense with a conventional seatbelt, which is usually provided for restraining the seat occupant of the vehicle seat. In particular, provision can thus be made for the vehicle seat to be configured so as to be free of such a seatbelt.

The filling medium used for filling the at least one airbag may be, in particular, a gas provided by a gas generator and/or a gas stored under high pressure in a gas store.

The holding device is preferably closer to a front periphery of the seat cushion than the backrest. In this way, it is possible to ensure in a particularly reliable manner that the holding device, and thus also the further connecting region of the at least one restraining element, is always located in front of the pelvis, the upper body and the head of the occupant when the seat occupant is seated on the seat unit of the vehicle seat.

The holding device is preferably fixed to a supporting structure of the seat unit in the region of the front periphery of the seat cushion. In this way, a particularly secure anchoring of the holding device is achieved, and the holding device is also located in front of the pelvis, the head and the upper body of the seat occupant when the seat occupant bends forward instead of the seat occupant's back being in contact with the front side of the backrest, for example. As a result, particularly reliable restraining of the seat occupant in the seat unit can also be achieved in different seating positions of the seat occupant on the seat unit of the vehicle seat. When arranging the vehicle seat in the motor vehicle, the supporting structure is used to securely fix the position of the vehicle seat in the motor vehicle.

The holding device preferably comprises a frame which at least partially surrounds an access opening for the seat occupant. In this case, the seat occupant can be brought into a seating position, in which the back of the seat occupant is in contact with a front side of the backrest, by moving their upper body through the access opening. Such a frame makes it possible for the at least one further connecting region to be positioned in a particularly flexible manner with regard to its spatial arrangement. In addition, the provision of the frame makes it possible to ensure in a particularly simple manner that the seat occupant is restrained in the vehicle seat by the at least one restraining element which is tensioned on account of the filling of the airbag.

Provision may be made for the holding device to be of closed configuration in a region between the frame, which surrounds the access opening or delimits the access opening, and the backrest of the vehicle seat. The seat unit of the vehicle seat is then configured in the manner of a half-shell in which the seat occupant can be seated. However, it is advantageous if the vision of the seat occupant in a transverse direction of the vehicle seat, that is to say toward the sides, is restricted as little as possible by the holding device. Correspondingly, in the case of such a configuration of the seat unit in the form of a half-shell, it is possible to form viewing windows and/or apertures in the holding device in particular in the region of the head of the seat occupant. Furthermore, it is possible for the frame to be coupled to the backrest merely at a few points, in particular at only one point.

Correspondingly, provision may be made for the vehicle seat to have at least one strut by way of which the frame is coupled to the backrest. The at least one strut ensures that the frame is fixed at a predetermined position in the longitudinal direction of the vehicle seat. Such a configuration makes the holding device particularly robust and resilient.

The at least one restraining element preferably extends along the holding device when the at least one airbag is brought into its stowage position. This is because the at least one restraining element then causes particularly little disruption for the seat occupant. In particular, the at least one restraining element can be laid along the holding device and be covered in this case by a trim element which tears, in particular at a predetermined breaking point, during the triggering of the airbag apparatus and the associated filling of the at least one airbag.

The holding device preferably has at least one receiving space for receiving at least the at least one airbag brought into its stowage position. For example, at least one airbag pocket may be formed on the holding device, said airbag pocket receiving the airbag when the at least one airbag is located in its stowage position. Thus, on the one hand, the at least one airbag is well protected in its stowage position. On the other hand, the airbag brought into its stowage position does not get in the way of the seat occupant, and it also does not adversely affect the appearance of the vehicle seat.

The at least one restraining element is preferably in the form of a strap which is connected, in the connecting region in which the at least one restraining element is coupled to the at least one airbag, to an outer side of a wall of the at least one airbag. It is thus possible for the at least one restraining element to be tensioned in a particularly reliable manner by the filling of the airbag. Such a strap is also particularly well suited to restraining the seat occupant in the seat unit of the vehicle seat in the case of an accident or impact, for instance.

The vehicle seat preferably has a first airbag and a second airbag. In this case, the first airbag and the second airbag are held on the holding device so as to lie opposite one another in the transverse direction of the vehicle seat by means of at least one respective restraining element. It is thus preferably the case that at least one first restraining element can be tensioned by filling of the first airbag, and at least one second restraining element can be tensioned by filling the second airbag. Due to the provision of two airbags and of the at least one restraining element assigned to the respective airbag, the seat occupant can be restrained in the vehicle seat by means of the tensioned restraining elements in a particularly simple manner.

When installing the vehicle seat into the motor vehicle, the transverse direction of the vehicle seat preferably runs parallel to the vehicle transverse axis of the motor vehicle.

Preferably, at least one first restraining element, which is coupled to the first airbag, is coupled to the holding device in a first connecting region and in a second connecting region. In this case, the two connecting regions of the at least one first restraining element are arranged spaced apart in the transverse direction of the vehicle seat from an imaginary central plane of the holding device, said central plane being oriented perpendicularly with respect to the transverse direction. Such a distribution of the two connecting regions on sides of the holding device that lie opposite one another in the transverse direction makes it possible for the filling of the first airbag to achieve a profile of the at least one first restraining element that is advantageous for restraining the seat occupant in the vehicle seat.

Preferably, at least one second restraining element, which is coupled to the second airbag, is coupled to the holding device in a first connecting region and in a second connecting region. In this case, the two connecting regions of the at least one second restraining element are arranged spaced apart in the transverse direction of the vehicle seat from an imaginary central plane of the holding device, said central plane being oriented perpendicularly with respect to the transverse direction. With regard to the second restraining element, it is also particularly advantageous if filling of the airbag makes it possible to achieve a profile of the second restraining element between sides or halves of the holding device that lie opposite one another in the transverse direction. This is because the distribution of the two connecting regions on the sides of the holding device that lie opposite one another makes it possible for the filling of the second airbag to achieve a profile of the at least one second restraining element that is advantageous for restraining the seat occupant in the vehicle seat.

The first connecting region is preferably arranged above the second connecting region in a vertical direction of the vehicle seat. In this way, filling of the airbag makes it possible to achieve an oblique profile of the at least one restraining element, which is connected to the respective airbag, from the first, upper connecting region down toward the second connecting region. Such an oblique profile of the at least one restraining element ensures that the seat occupant is restrained on the vehicle seat in a very effective manner in the event of the airbag apparatus being triggered.

This applies in particular if the at least one first restraining element and the at least one second restraining element intersect, that is to say run in a criss-crossing manner, in the functional position of the first airbag and the second airbag.

Finally, it has been shown to be advantageous if the second connecting region is arranged at a point of the holding device which is covered by one of the thighs of the seat occupant in a seating position of the seat occupant, in which thighs of the seat occupant rest on a surface of the seat cushion. This is because the tensioning of the at least one restraining element which is coupled to the holding device way of the second connecting region then pushes the thighs of the seat occupant together. This is also conducive to good restraining of the seat occupant in the vehicle seat.

Further features of the invention will emerge from the claims, from the figures and from the description of the figures. The features and combinations of features mentioned above in the description, and also the features and combinations of features mentioned below in the description of the figures and/or shown only in the figures, may be used not only in the respectively specified combination but also in other combinations or individually.

The invention will now be explained in more detail on the basis of a preferred exemplary embodiment and with reference to the drawings.

DETAILED DESCRIPTION OF THE DRAWINGS

Figure 1:
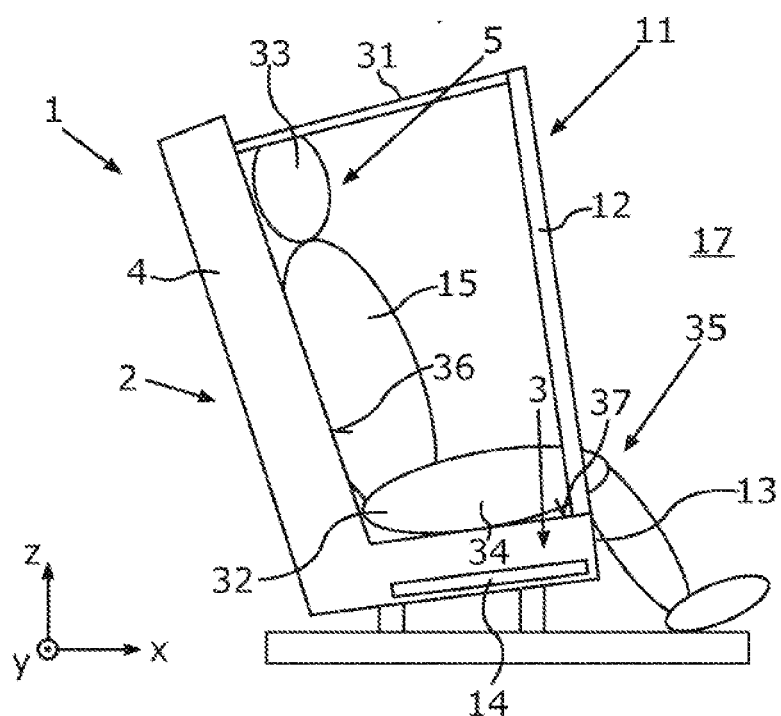
FIG. 1 is a schematic illustration and a side view of a vehicle seat, in which restraining straps and two airbags have been integrated into an annular frame which is fixed to a supporting structure of the vehicle seat in the region of a front periphery of a seat cushion of the vehicle seat.

FIG. 1 shows, in highly schematic form, a vehicle seat 1 of a motor vehicle, comprising a seat unit 2 with a seat cushion 3 and a backrest 4. A seat occupant 5 of the vehicle seat 1 seated on the seat cushion 3 is schematically illustrated in FIG. 1. In the seating position of the seat occupant 5 shown in FIG. 1, the back of the seat occupant 5 is in contact with a front side 36 of the backrest 4. Furthermore, both thighs 34 of the seat occupant 5 rest on a surface 37 of the seat cushion 5 in the seating position of the seat occupant 5 shown in FIG. 1 to FIG. 3.

Figure 2:
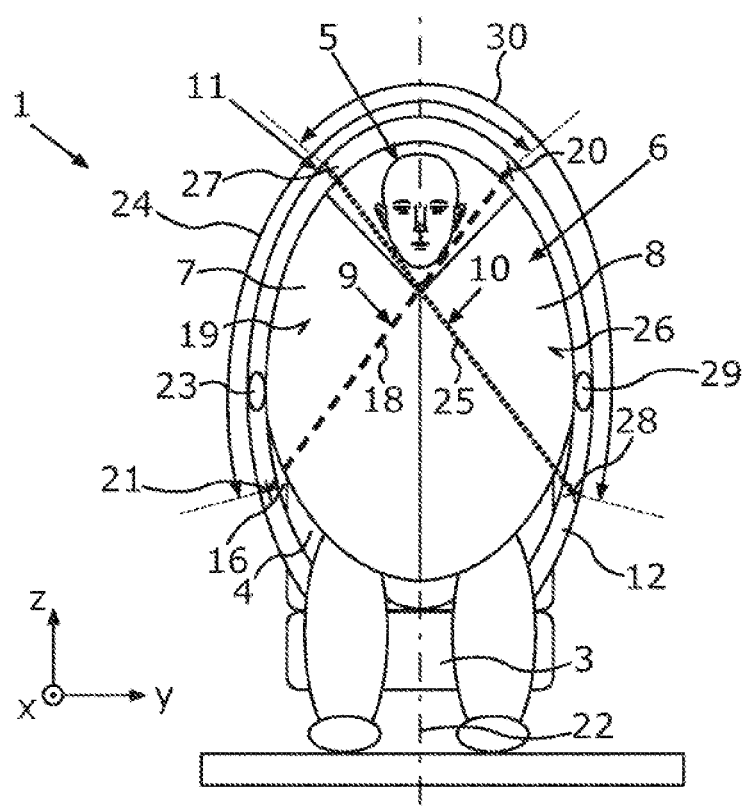
FIG. 2 is a schematic front view of the vehicle seat according to FIG. 1, wherein the two airbags of an airbag apparatus of the vehicle seat have been filled and brought into their functional position, and wherein the airbags have tensioned respective restraining straps or arrester straps which intersect in front of the upper body of the seat occupant.

The vehicle seat 1 comprises an airbag apparatus 6, of which a first airbag 7 and a second airbag 8 are schematically shown in FIG. 2. In FIG. 2, the airbags 7, 8 are illustrated after the airbag apparatus 6 has been triggered and thus in a filled state. In a manner known per se, the airbags 7, 8 of the airbag apparatus 6 are filled with a filling medium when corresponding sensors of the airbag apparatus 6 or of the motor vehicle detect very rapid deceleration of the motor vehicle, for instance as a result of an impact of the motor vehicle against an obstacle or prior to such an impact.

In the present case, the airbag apparatus 6 comprises restraining elements for example in the form of arrester straps 9, 10 or of arrester cables. In this case, a first arrester strap 9 is tensioned on account of filling of the first airbag 7, and a second arrester strap 10 is tensioned on account of filling of the second airbag 8. According to the illustration in FIG. 2, the tensioned arrester straps 9, 10 ensure, in cooperation with the airbags 7, 8, that the seat occupant 5 is restrained on the seat unit 2.

In the present case, the vehicle seat 1 has a holding device 11 which is schematically shown in a side view in FIG. 1. The holding device 11 comprises a frame 12 which, in the present case, is fixed to a supporting structure 14 of the seat unit 2 in the region of a front periphery 13 of the seat cushion 3 in a manner that is not shown in any more detail. The arrester straps 9, 10 are likewise fastened to the frame 12.

Since the frame 12 is located in front of the backrest 4 and in particular in front of the upper body 15 of the seat occupant 5 in the longitudinal direction x of the vehicle seat 1, the filling of the airbags 7, 8 and the associated tensioning of the arrester straps 9, 10 have the effect that an access opening 16 surrounded or enclosed by the frame 12 is closed to such an extent that the seat occupant 5 cannot pass through the access opening 16 into a surrounding area 17 (see FIG. 1) of the vehicle seat 1.

The respective arrester strap 9, 10 is coupled, on the one hand, to the frame 12 and, on the other hand, to the respective airbag 7, 8. For example, the first arrester strap 9 has a connecting region 18 in which the first arrester strap 9 is coupled to an outer side 19 of a wall of the first airbag 7. The first arrester strap 9 has further connecting regions 20, 21 in which the first arrester strap 9 is coupled to the frame 12 of the holding device 11, said frame being configured in the manner of a safety ring.

In this case, the first connecting region 20, in which the first arrester strap 9 is connected to the frame 12 or fixed to the frame 12, is arranged above the second connecting region 21 in the vertical direction z of the vehicle seat 1. Furthermore, according to the front view in FIG. 1, with respect to a transverse direction y of the vehicle seat 1, the first connecting region 20 is arranged to the right of an imaginary central plane 22 of the holding device 11. By contrast, the second, lower connecting region 21, in which the first arrester strap 9 is likewise connected to the frame 12 or fixed to the frame 12, is arranged in a half of the frame 12 that lies opposite to the first connecting region 20. Both the first connecting region 20 and the second connecting region 21 are thus spaced apart from the imaginary central plane 22 of the holding device 11.

When the first airbag 7 is located in its stowage position (see FIG. 1), the first airbag 7 is arranged in a receiving space such as for example an airbag pocket 23 which is formed in the holding device 11, for example in the frame 12. The first arrester strap 9 then extends along the frame 12 from the first connecting region 20 as far as the second connecting region 21. In FIG. 2, a double-headed arrow 24 indicates the length of a portion of the frame 12 along which the first arrester strap 9 runs or extends so long as the first airbag 7 has not yet been triggered and, just like the first arrester strap 9, is located in its stowage position.

After the triggering of the airbag apparatus 6 and the associated filling of the first airbag 7, however, the first arrester strap 9 is tensioned, with the result that it runs from the upper, first connecting region 20 obliquely downward toward the second connecting region 21. Due to the fact that the first arrester strap 9 in this case crosses the imaginary central plane 22 of the holding device 11, particularly good restraining of the seat occupant 5 in the seat unit 2 can be achieved.

In a similar manner as described for the first airbag 7 and the first arrester strap 9, the second arrester strap 10 also has a connecting region 25 in which the second arrester strap 10 is connected to an outer side 26 of a wall of the second airbag 8. Furthermore, the second arrester strap 10 is also connected to the frame 12 or fixed to the frame 12 at two further connecting regions 27, 28. In this case, the first connecting region 27 of the second arrester strap 10, just like the first connecting region 20 of the first arrester strap 9, is located above the second connecting region 28, in which the second arrester strap 10 is fixed to the frame 12, in the vertical direction z of the vehicle seat 1.

Furthermore, with respect to the imaginary central plane 22, the first connecting region 27 of the second arrester strap 10 is located within a first half of the frame 12. By contrast, the second connecting region 28 of the second arrester strap 10 is located within a second half of the frame 12 that lies opposite to this first half.

In the triggered state of the airbag apparatus 6 shown in FIG. 2, the tensioned second arrester strap 10 extends from the upper, first connecting region 27, in which the second arrester strap 10 is fixed to the frame 12, obliquely down to the right to the second connecting region 28, in which the second arrester strap 10 is likewise fixed to the frame 12. In the variant of the vehicle seat 1 shown by way of example in FIG. 2, the arrangement of the connecting regions 20, 21, 27, 28 of the arrester straps 9, 10 on the frame 12 thus has the effect that the arrester straps 9, 10 intersect in front of the upper body 15 of the seat occupant 5 in the triggered state of the airbag apparatus 6.

Just as described for the first airbag 7, the holding device 11 also has a receiving space for example in the form of a second airbag pocket 29 for stowing the second airbag 8. In this case, the airbag pocket 29 is likewise formed in the region of the frame 12 of the holding device 11.

Furthermore, the second arrester strap 10 also extends along the frame 12 when the second airbag 8 is located in its stowage position and is thus received in the airbag pocket 29. In this case, the second arrester strap 10 reaches from the first connecting region 27 as far as the second connecting region 28. In FIG. 2, a corresponding further double-headed arrow 30 illustrates the length of the portion along which the second arrester strap 10 extends, in its rest position or starting position or stowage position, along the frame 12.

Viewing FIG. 1 and FIG. 2 together, it is apparent that the frame 12 of the holding device 11 is coupled to the backrest 4 of the seat unit 2 by means of at least one strut 31. The at least one strut 31 is used to support the frame 12, which is configured in the manner of a safety ring. Furthermore, the provision of the at least one strut 31 allows the seat occupant 5 to have an unobstructed view in the transverse direction y of the vehicle seat 1.

In a variant of the vehicle seat 1 in which the space between the at least one strut 31, the backrest 4 and the frame 12 is also closed, it is correspondingly possible for the vehicle seat 1 to be configured in the manner of a half-shell, at the front edge of which the at least one airbag 7, 8 is attached. In the case of such a configuration of the vehicle seat 1, it is advantageous if openings and/or windows or the like which can be looked through are arranged in corresponding side walls of the half-shell so that the seat occupant 5 can view the surrounding area 17 of the vehicle seat 1 in the transverse direction y of the vehicle seat 1.

However, both in the variant of the vehicle seat 1 shown by way of example in the present case and in the configuration of the vehicle seat 1 in the manner of a half-shell, the at least one airbag 7, 8 serves as a positioning aid for the at least one arrester strap 9, 10 or similar restraining element. These restraining elements are positioned around the seat occupant 5 on account of the filling of the at least one airbag 7, 8.

Since the at least one restraining element, that is to say in the present case the arrester straps 9, 10, for example, is coupled to the holding device 11 of the vehicle seat 1, the at least one restraining element, that is to say in the present case the arrester straps 9, 10, for example, can be used to introduce energy into the seat unit 2.

In the present case, the arrangement of the frame 12 in the region of the front edge of the seat cushion 3 ensures that a restraining system, which comprises the at least one restraining element for example in the form of the arrester straps 9, 10 and the at least one airbag 7, 8, is always arranged in front of the upper body 15, the pelvis 32 and the head 33 of the seat occupant 5 in the longitudinal direction x of the vehicle seat 1. As a result, it is possible for the access opening 16 in front of the seat occupant 5 to be closed, for instance in the event of an impact of the motor vehicle equipped with the vehicle seat 1 against an obstacle. In a similar manner, in the case of the configuration of the seat unit 2 of the vehicle seat 1 in the manner of a half-shell, it is possible for a corresponding opening of the half-shell in front of the seat occupant 5 to be closed.

The at least one restraining element for example in the form of the arrester straps 9, 10 shown by way of example in the present case is positioned in front of the seat occupant 5. This ensures that the restraining system, which in the present case comprises the two airbags 7, 8 and the two arrester straps 9, 10, is always closed in front of the seat occupant 5 in the longitudinal direction x. Consequently, the seat occupant 5 can be restrained in the seat unit 2 in a satisfactory manner.

In contrast to what is illustrated in FIG. 2, it is possible in a further variant of the vehicle seat 1 for the second connecting region 21, 28 of the respective arrester strap 9, 10 to be arranged at a point of the holding device 11, in particular at a point of the frame 12, which is covered by a respective thigh 34 of the seat occupant 5 in the seating position of the seat occupant 5 shown in FIG. 1.

For example, the second connecting region 28 which is on the right in FIG. 2 may be arranged below the right thigh 34 of the seat occupant 5, and the second connecting region 21 which is on the left in FIG. 2 may be arranged below the left thigh 34 of the seat occupant 5. This ensures that the legs 35 of the seat occupant 5 are pushed together during deployment of the airbags 7, 8.

Figure 3:
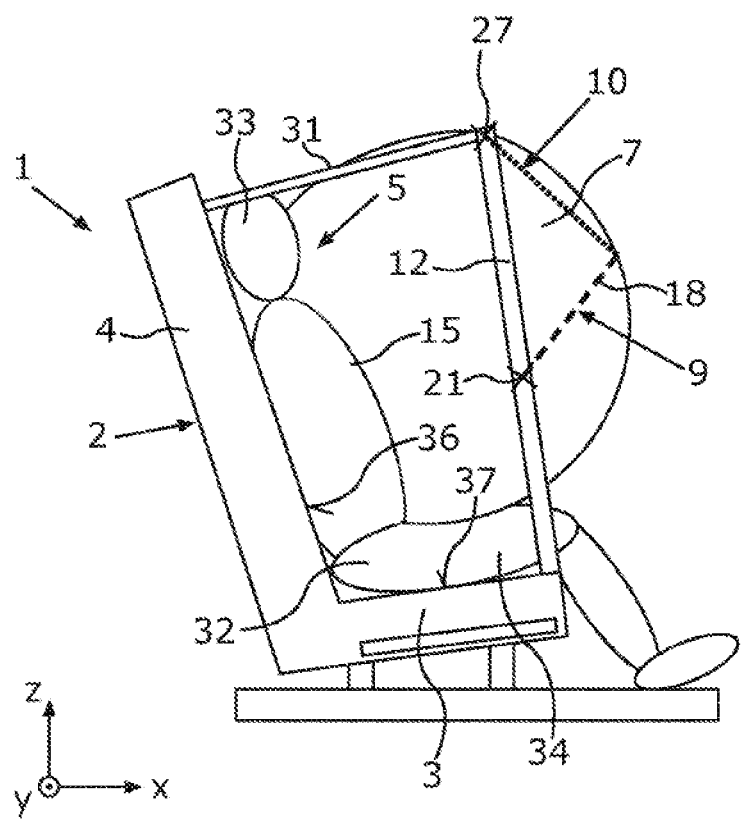
FIG. 3 is a further schematic side view of the vehicle seat in the state according to FIG. 2.

The manner in which the deployed and filled airbags 7, 8, in cooperation with the arrester straps 9, 10, restrain the seat occupant 5 on the seat unit 2 of the vehicle seat 1 is readily apparent from the schematic side view of the vehicle seat 1 in FIG. 3.

On account of the restraining system which is provided by the airbags 7,8 in cooperation with the arrester straps 9, 10, provision may be made in the case of the vehicle seat 1 for the latter to be configured without a seatbelt which is otherwise customary. Correspondingly, a restraining system without seatbelts can be provided by the vehicle seat 1. This is because the filling of the airbags 7, 8 and the associated tensioning of the arrester straps 9, 10 restrains the seat occupant 5 in the seat unit 2 of the vehicle seat 1 in a reliable manner in the case of any accident involving the motor vehicle equipped with the vehicle seat 1.

In an installed position of the vehicle seat 1 in the motor vehicle (not shown in any more detail), it is preferable for the longitudinal direction x of the vehicle seat 1 to run parallel to the vehicle longitudinal axis, the transverse direction y of the vehicle seat 1 to run parallel to the vehicle transverse axis and the vertical direction z of the vehicle seat 1 to run parallel to the vehicle vertical axis.

However, provision may also be made for the vehicle seat 1 to be able to be brought into orientations in which the longitudinal direction x of the vehicle seat is not oriented parallel to the vehicle longitudinal axis of the motor vehicle, for instance by moving the vehicle seat 1 into a corresponding position by rotation about an axis that coincides with the vertical direction z. In the case of such an orientation, the arrester straps 9, 10 preferably also ensure, in cooperation with the airbags 7, 8, that the seat occupant 5 is restrained after the airbag apparatus 6 has been triggered.

The examples show the manner in which the invention provides a vehicle seat 1 in the form of a safety cell with integrated emergency restraining system.

LIST OF REFERENCE DESIGNATIONS

1 Vehicle seat
2 Seat unit
3 Seat cushion
4 Backrest
5 Seat occupant
6 Airbag apparatus
7 Airbag
8 Airbag
9 Arrester strap
10 Arrester strap
11 Holding device
12 Frame
13 Periphery
14 Supporting structure
15 Upper body
16 Access opening
17 Surrounding area
18 Connecting region
19 Outer side
20 Connecting region
21 Connecting region
22 Central plane
23 Airbag pocket
24 Double-headed arrow
25 Connecting region
26 Outer side
27 Connecting region
28 Connecting region
29 Airbag pocket
30 Double-headed arrow
31 Strut
32 Pelvis
33 Head
34 Thigh
35 Leg
36 Front side
37 Surface

The invention claimed is:

1. A vehicle seat for a motor vehicle, comprising:
a seat unit comprising a seat cushion and a backrest;
an airbag apparatus comprising at least one airbag and at least one restraining element tensionable by filling the at least one airbag; and
a holding device spaced apart from the backrest in a longitudinal direction of the vehicle seat,
wherein the at least one restraining element has a connecting region in which the at least one restraining element is coupled to the at least one airbag,
wherein, due to the filling, the at least one airbag can be brought from a stowage position into a functional position in which the at least one airbag provides an impact protection for an upper body of a seat occupant of the vehicle seat in a longitudinal direction of the vehicle seat,
wherein the at least one restraining element has at least one further connecting region in which the at least one restraining element is coupled to the holding device of the vehicle seat,
wherein the holding device comprises a frame which at least partially surrounds an access opening for the seat occupant, and
wherein the seat occupant can be brought into a seating position, in which the back of the seat occupant is in contact with a front side of the backrest, by moving their upper body through the access opening.

2. The vehicle seat according to claim 1, wherein
the holding device is closer to a front periphery of the seat cushion than the backrest.

3. The vehicle seat according to claim 2, wherein
the holding device is fixed to a supporting structure of the seat unit in a region of the front periphery of the seat cushion.

4. The vehicle seat according to claim 1, wherein
the vehicle seat has at least one strut by way of which the frame is coupled to the backrest.

5. The vehicle seat according to claim 1, wherein
the at least one restraining element extends along the holding device when the at least one airbag is brought into a stowage position.

6. The vehicle seat according to claim 1, wherein
the at least one restraining element is in the form of a strap which is connected, in the connecting region in which the at least one restraining element is coupled to the at least one airbag, to an outer side of a wall of the at least one airbag.

7. A vehicle seat for a motor vehicle, comprising:
a seat unit comprising a seat cushion and a backrest;
an airbag apparatus comprising at least one airbag and at least one restraining element tensionable by filling the at least one airbag; and
a holding device spaced apart from the backrest in a longitudinal direction of the vehicle seat,
wherein the at least one restraining element has a connecting region in which the at least one restraining element is coupled to the at least one airbag, wherein, due to the filling, the at least one airbag can be brought from a stowage position into a functional position in which the at least one airbag provides an impact protection for an upper body of a seat occupant of the vehicle seat in a longitudinal direction of the vehicle seat, wherein the at least one restraining element has at least one further connecting region in which the at least one restraining element is coupled to the holding device of the vehicle seat, and wherein the holding device has at least one receiving space for receiving at least the at least one airbag brought into a stowage position.

8. A vehicle seat for a motor vehicle, comprising:

a seat unit comprising a seat cushion and a backrest;

an airbag apparatus comprising at least one airbag and at least one restraining element tensionable by filling the at least one airbag; and a holding device spaced apart from the backrest in a longitudinal direction of the vehicle seat, wherein the at least one restraining element has a connecting region in which the at least one restraining element is coupled to the at least one airbag, wherein, due to the filling, the at least one airbag can be brought from a stowage position into a functional position in which the at least one airbag provides an impact protection for an upper body of a seat occupant of the vehicle seat in a longitudinal direction of the vehicle seat, wherein the at least one restraining element has at least one further connecting region in which the at least one restraining element is coupled to the holding device of the vehicle seat, wherein the vehicle seat has a first airbag and a second airbag, and wherein the first airbag and the second airbag are held on the holding device so as to lie opposite one another in a transverse direction of the vehicle seat by at least one respective restraining element.

9. The vehicle seat according to claim 8, wherein a first restraining element, which is coupled to the first airbag, is coupled to the holding device in a first connecting region and in a second connecting region, the two connecting regions of the first restraining element are arranged spaced apart in the transverse direction of the vehicle seat from an imaginary central plane of the holding device, said central plane being oriented perpendicularly with respect to the transverse direction.

10. The vehicle seat according to claim 9, wherein a second restraining element, which is coupled to the second airbag, is coupled to the holding device in a first connecting region and in a second connecting region, the two connecting regions of the second restraining element are arranged spaced apart in the transverse direction of the vehicle seat from an imaginary central plane of the holding device, said central plane being oriented perpendicularly with respect to the transverse direction.

11. The vehicle seat according to claim 10, wherein the first connecting region of the first restraining element is arranged above the second connecting region of the first restraining element in a vertical direction of the vehicle seat, and the first connecting region of the second restraining element is arranged above the second connecting region of the second restraining element in the vertical direction of the vehicle seat.

12. The vehicle seat according to claim 9, wherein the first connecting region is arranged above the second connecting region in a vertical direction of the vehicle seat.

* * * * *